United States Patent [19]

Gosselin

[11] Patent Number: 4,964,216
[45] Date of Patent: Oct. 23, 1990

[54] TORQUE LIMITING DEVICE FOR SHEARS

[75] Inventor: Robert G. Gosselin, Springfield, Mass.

[73] Assignee: Fiskars Oy AB, Helsinki, Finland

[21] Appl. No.: 215,078

[22] Filed: Jul. 5, 1988

[51] Int. Cl.⁵ .............................................. B26B 13/00
[52] U.S. Cl. ...................................... 30/254; 30/200; 30/144
[58] Field of Search ................. 30/254, 262, 194, 200, 30/211, 173; 81/329, 407, 427, 319, 320

[56] References Cited

U.S. PATENT DOCUMENTS 2,819,638  1/1958  Palmer ............................... 81/427.5
3,885,306  5/1975  Herman .............................. 30/254

Primary Examiner—Frank T. Yost
Assistant Examiner—William Fridie, Jr.
Attorney, Agent, or Firm—Foley & Lardner

[57] ABSTRACT

A shearing device capable of being articulated between open and closed positions for cutting material includes pairs of handle levers and shearing elements rotatably mounted on a pivot mechanism. A clutch assembly comprising plates with complimentary and fixed configurations biased in abutting and intermeshing relationship when in a predetermined rotary alignment is positioned between the pairs of handle levers and switching elements. The clutch assembly is responsible to a predetermined force generated when the handle levers are articulated towards a closed position and the shearing elements encounter cut resistant material for camming the plates out of meshing relationship and operatively disconnecting the handle levers.

22 Claims, 5 Drawing Sheets

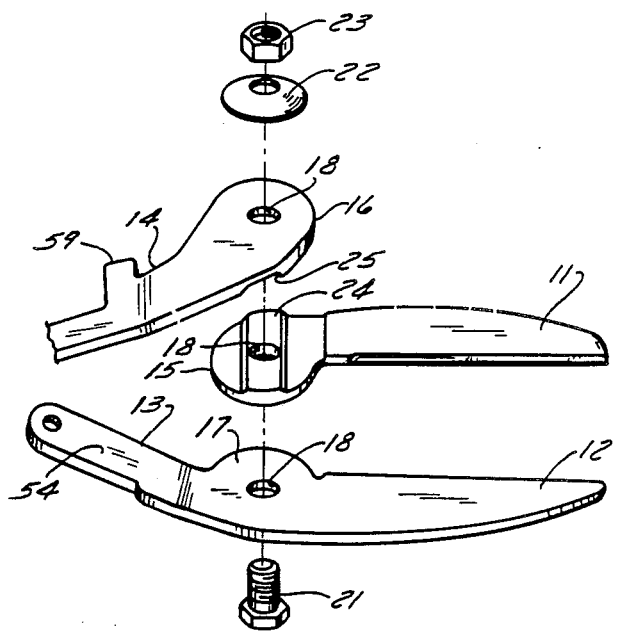
FIG. 6
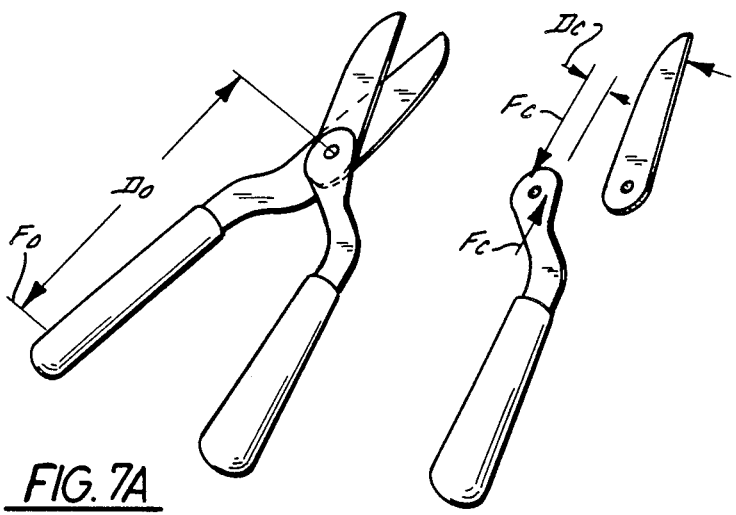
FIG. 7A
FIG. 7B

4,964,216

TORQUE LIMITING DEVICE FOR SHEARS

FIELD OF THE INVENTION

This invention relates to a shearing device with a clutch mechanism and more particularly to a shearing device having a clutch mechanism which slips in response to a predetermined force.

BACKGROUND OF THE INVENTION

Shearing devices, particularly typified by manually operated hedge clippers and lopping shears are often used to cut shrubbery beyond the normal arm reach of the operator. To extend the reach requires telescopic or extendable handles. Such handles are of necessity light to enable the operator to effectively cope with the added distance. Extending of the handles, however, increases the distance from the handle grip to the axis or pivot point of the shears, providing the operator with a tremendous mechanical advantage which can generate considerable torque about the pivot axis of the shearing device. As a result, attempts to cut large or cut resistant objects with such devices can result in damage to the device, generally to the light weight, extendable handles. Bending and distortion thereof often occurs.

Clutch mechanisms to cause slippage when undesirable overload occurs in a mechanical device are, in general, well known. Such prior art clutch mechanisms, however, tend to be complex, and generally too heavy and bulky for effective use in hedge clippers.

SUMMARY OF THE INVENTION

The present invention provides an economical, simple and light weight clutch assembly in which there are few movable parts, particularly adapted for use in a shearing device.

In accordance with one aspect of the invention a clutch assembly uses a portion of one of the lever handles and shearing members as clutch plates. In accordance with a preferred embodiment, the shearing members and handles are pivotably mounted on a common pivot axis. One of the handles and shearing members ar integral while the others terminate in clutch plates mounted on the axis. The adjacent faces of the clutch plates have surface configurations which abut and intermesh when in a predetermined rotary alignment about the axis thus placing the respective shearing member and handle in an operative relationship. The plates are maintained in this relationship by a biasing mechanism which may comprise a spring mounted about a bolt serving as the pivot axis. A nut of the lock type adjustably fixed to the bolt serves as a loading mechanism driving the spring against one of the plates.

By establishing a predetermined load against the plates and employing a certain surface configuration of the clutch plates, the clutch assembly is made responsive to a predetermined cutting force within the structural limits of the device. As the lever handles are closed and the shearing members encounter a cut resistant object, the predetermined force is reached. The plates then cam out of the meshing relationship, breaking the operative relationship between the handle and shearing member, and preventing damage to the device. When the level handles are articulated open, the plates return to the meshing relationship putting the handle and shearing member back into the operating relationship without any additional effort on the part of the operator.

Still another embodiment of the present invention uses an intermediate clutch plate between the clutch plates of the operatively connected handle and shearing member. This plate is provided with surface configurations on both sides which abut and mesh with the adjointly positioned clutch plates. A biasing mechanism yieldably maintains the plates in the abutting and meshing relationship. Once a predetermined cutting force is encountered, the plates come out of alignment and the operative connection between the handle and shearing member is broken.

The various embodiments of the present invention not only find application in use with shears but can also be employed with other cutting devices such as scissors when the cutting blades encounter resistance greater than a cutting force for which the scissors were designed.

BRIEF DESCRIPTION OF THE DRAWINGS

A preferred embodiment of the present invention is hereinafter described in conjunction with the appended drawings in which like numerals denote like elements and:

FIG. 6 is a disassembled, exploded perspective of the shear device and clutch assembly depicted in FIG. 2;

FIG. 7 is a schematic demonstrating the sum of torques around the pivot point involved when the cutting blades of the shears encounter an object highly resistant to cutting and are in a static condition;

BRIEF DESCRIPTION OF THE PREFERRED EMBODIMENT

Figure 1:
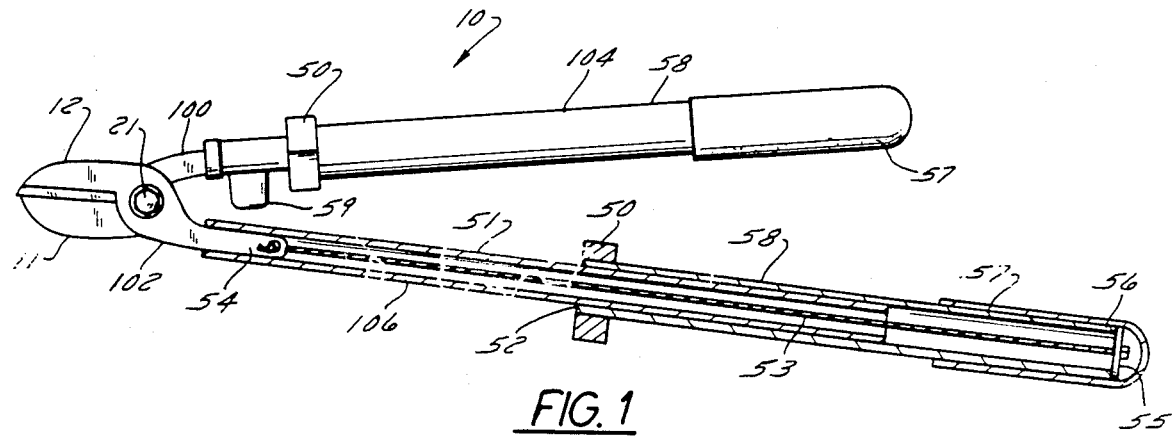
FIG. 1 is a perspective view of a typical shearing assembly, such as a lopper, with certain parts in section and having telescopic handles which can be used in cooperation with the present invention.

As illustrated in FIG. 1, a shearing assembly includes a pair of operating members, 100 and 102, such as, for example, blades or shearing members each respectively associated with handle levers 104 and 106. Members 100 and 102 are operatively connected to handles and 106 in the sense that articulation or movement of the handles will under normal conditions in turn, move the blade members. While FIG. 1 is specific to a particular type of shear, it should be understood that the present invention as described hereinafter is admirably suited to many other cutting devices such as, for example, shears and scissors of all types. The shearing assembly of FIG. 1 is primarily illustrated to show the telescopic capability of the handle with which the present invention has applicability.

The ensuing description thus focuses, in part, upon a typical construction of such handles in order to more clearly set forth the environment in which the present invention is particularly suited. It is understood, however, that the present invention has application with other variety of devices having handles and is not limited to applications involving extendable handles.

When it is desired to use the shearing assembly illustrated in FIG. 1 in applications where longer handles are needed, handle 104 may be extended by loosening nut 50 and extending the handle to any desired length within the limits established by the construction of the handles. Handle 106 is in a fully extended position exposing inner handle tube 51 which is secured to flange 54 extending from member 102. The outer tube 58 is secured at its inner terminal end 52 by nut 50. Further extension of tube 51 is prevented by a retaining cord 53 secured at its ends respectively to a flange 54 extending from member 102 and a plate 55 secured to the outer ends 56 of tube 51. Each end of outer tubes 58 is covered by a respective grip 57. Abutment members or limit stops 59 prevent closing handles 104 and 106 and therefore shearing members 100, 102 beyond a predetermined point.

Figure 3:
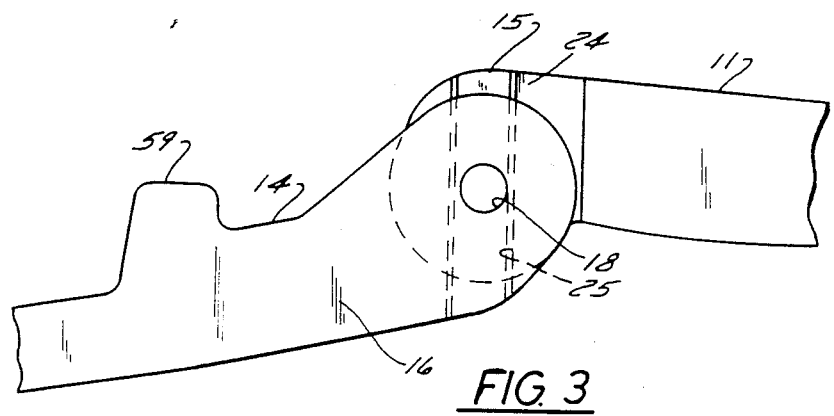
FIG. 3 is a top plan view of the shears showing the clutch portion of the single handle and a blade in a normal relationship without the pivot mechanism.
Figure 2:
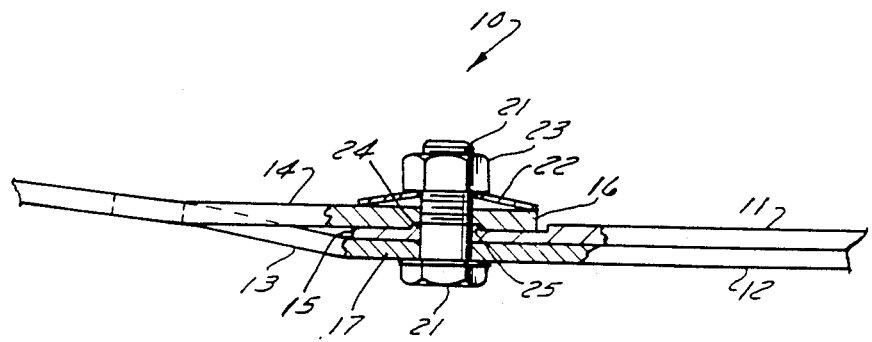
FIG. 2 is a side view, partially in section, of a clutch assembly of a shears in accordance with the present invention.

Referring specifically to FIGS. 2, 3 and 6, which may, for example, represent portions of a shear such as a hedge shear, the pivoted end of shearing member 11 forms a generally circular clutch plate 15 positioned in an abutting relationship with the face of a similarly shaped clutch plate 16 formed from the terminal end of handle 14. The intermediate portion of handle 13 and shearing member 12 forms still another plate 17 which abuts the opposite face of clutch plate 15. Plates 15, 16 and 17 include bores 18 which, in assembly are coaxially aligned to receive a bolt 21. Bolt 21 serves as the pivot for shear assembly 10. A spring 22 is mounted around bolt 21 against clutch plate 16 and fixed in place by adjustable nut 23 secured to bolt 21.

Figure 4:
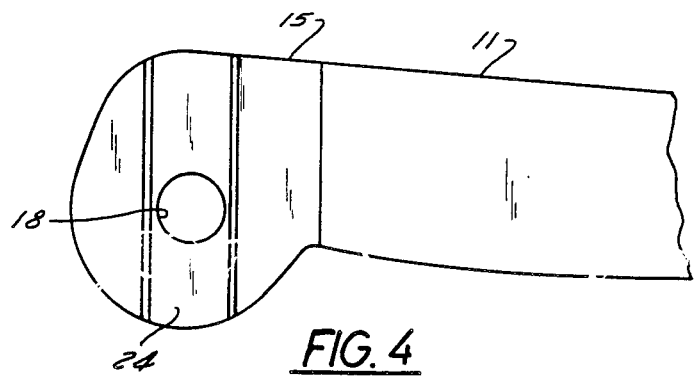
FIG. 4 is a top plan view of the blade and clutch face set forth in FIG. 3 without the handle.
Figure 4A:
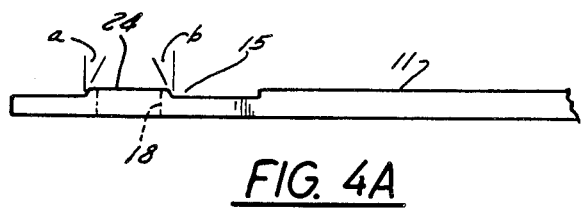
FIG. 4A is a front view of the blade and clutch face shown in FIG. 4.
Figure 5:
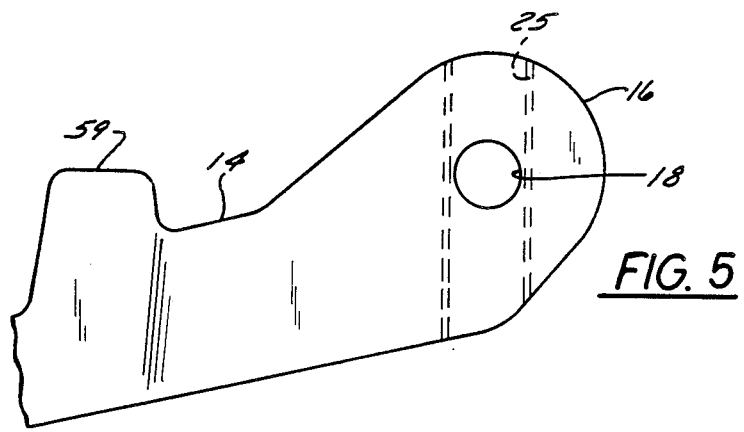
FIG. 5 is a top plan view of the handle member and clutch face of FIG. 3 without the blade.
Figure 5A:
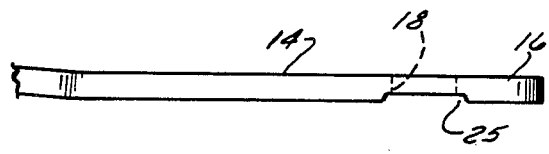
FIG. 5A is a front view of the handle member and clutch face in FIG. 5.

Plate 15 includes radially directed projecting tongue 24 which is the form of a truncated triangle in section (best seen in FIGS. 4 and 4A) which normally mates or meshes with a radially directed groove 25 in the face of plate 16 (best seen in FIGS. 5 and 5A). The sidewalls of both tongue 24 and groove 25 are correspondingly beveled, disposed at slight angles, "a" and "b" to the vertical to facilitate selective disengagement, as will be described. Spring 22 provides an inwardly directly axial force which urges plates 15, 16 and 17 together, tending to maintain tongue 24 within groove 25. Thus, the surface configuration of clutch plate 15 abuts and meshes with the surface configuration of clutch plate 16 when properly aligned.

Spring 22 may be any spring action device, such as, for example, spring-action washers, leaf springs or coils springs that provide the appropriate axial force on plates 15, 16 and 17. Spring 22 ensures that cutting edges of blades 11 and 12 are biased toward each other to obtain a positive shearing action and, as discussed in more detail below, biases clutch plates 15, 16 together. The use of a spring washer having a triangular section, such as, for example, a Belleville spring washer is preferred. Such springs provide an extremely linear and strong force over short distances. Additionally the conically shaped springs are available in a variety of shapes suitable for numerous applications.

In normal cutting operations, shear assembly 10 operates in a conventional manner. The operator grips the handles 104 and 106 near the respective ends and levers the handles together. Blades 11 and 12 converge and diverge in parallel planes in direct relationship with the leveraging of the corresponding handles 13, 14. Clutch plates 15 and 16 remain intermeshed or coupled under the directed force exerted by spring 22 through the fit of tongue 24 within groove 25 and rotate about a common axis provided by bolt 21 as a unit.

Nut 23 is adjustable to vary the load acting through spring 22 upon the various clutch faces. During cutting operation, the force created by levering handle 14 is transmitted to blade 11 by interaction of tongue 24 with groove 25. The angled (or alternatively beveled) sides of tongue 24, perhaps best seen in FIG. 8, cause such force to include outwardly directed axial component, tending to cause tongue 24 to raise in, and ultimately be dislodged from, groove 25. During normal cutting operations, the inwardly directed axial force of spring 22 is greater than the outwardly directed axial component of the cutting force acting upon tongue 24 and tongue 24 and groove 25 remain engaged. Thus, blade 11 and handle 14 are "operatively connected" as opposed to being directly connected, e.g., integrally connected, like blade 12 and handle 13. The operative connection means that blade 11 and handle 14 will operated as if directly connected until disconnected through the camming action occurring to the lifting of tongue 24 out of groove 25. In the event, however, that the user of the shear assembly 10 encounters a particularly tough material, the outwardly axial force component generated by levering the handles becomes large enough to cause tongue 24 to cam out of groove 25, thereby disengaging clutch plates 15 and 16 and permitting a relative rotary motion between the faces and operatively disconnecting blade 11 and handle 14. Thus, the levering force cannot be transmitted to blade 11 and the cutting action of assembly 10 ceases. Once the clutch plates 15 and 16 are out of alignment, the operator continues to close handles 13 and 14 until limit stops 59 are in abutment. When handles 13 and 14 are thereafter articulated open, blade 12 held in light frictional contact with blade 11 by spring 22 causes blade 11, and therefore plate 16, to move with blade 12. Thus, relative rotary motion continues to occur between plates 15 and 16 but in a reverse direction such that tongue 24 will move back into groove 25. At this point, plates 15 and 16 are in alignment thereby operatively connecting blade 11 again to handle 14. The reestablishment of the operative connection is accomplished without any additional effort on the part of an operator who continues to articulate the handles of the shearing assembly open and close in a normal manner.

The exact value of the predetermined force at which camming action occurs is a matter of the result desired. Since the ultimate objective is to prevent damage to the shear assembly, particularly to the handles, then the type of material comprising the handles becomes a paramount factor in determining this point. Generally, it is desirable to make the shears, and, in particular, the handles, as light as possible, especially in applications requiring extended handles as shown in FIG. 1. Lightweight material such as hollow aluminum tubes are often used in such applications. As a result, a compromise must be struck between strength and weight, and it becomes extremely important to limit the amount of force applied to such handles by an operator to avoid damage.

Figure 8:
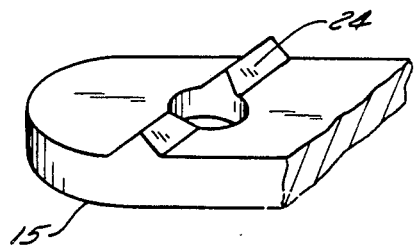
FIGS. 8 and 8A are, respectively, a perspective and side views of a clutch plate carrying a camming projection.
Figure 8A:
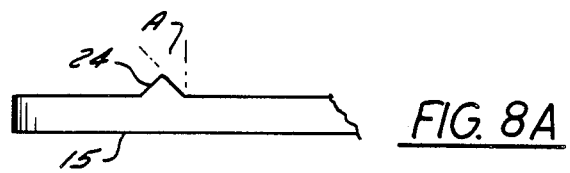

Once the permissible upper limit to the force that can be applied to the handles has been determined, then certain other parameters are considered: the load exerted by spring 22; the depth of groove 25 and height of tongue 24; and the angle of deviation, angle A, from vertical (axial) of the sides of tongue 24. Tongue 24 is shown here as having a triangular section which is an alternative to the preferred truncated section shown in FIG. 4. FIG. 8 illustrates the angle of deviation A as exaggerated in order to clearly visualize the angle. While the precise angles of tongue 24 and the appropriate depth of groove 25 and height of tongue 24, depend upon value of maximum handle force permissible, in general, the force required to initiate camming action of tongue 24 out of groove 25 is inversely proportional to angular deviation from the axial plane; i.e. the necessary force increases as angle A approaches zero. Increasing the depth of groove 25 similarly increases the requisite camming force. In the embodiment of FIGS. 2-6, angle A is chosen to be approximately five degrees (5°), tongue 24 is approximately 0.040 to 0.045 inches in height, and groove 25 approximately 0.047 to 0.052 inches in depth.

To more fully explain the principles involved, reference is made to the schematic of FIG. 7. Generally, the sum of the torques about a pivot in a static situation is zero. Such a situation, in effect, occurs where the blades of the shears encounter extremely resistant material as shown in FIG. 7. Thus, the product of the force $F_0$ exerted by an operator and its distance $D_0$ from the pivot point would equal the product of the cutting force $F_c$ times its distance $D_c$ from the pivot point as in the equation $F_0 \times D_0 = F_c \times D_c$. Any increase in $F_0$ would be resisted by an appropriate increase in $F_c$. Since the maximum allowable $F_0$ and the distance $D_0$ are known, and the distance $D_c$ generally is constant, the maximum force $F_c$ can be readily determined.

Figure 9A:
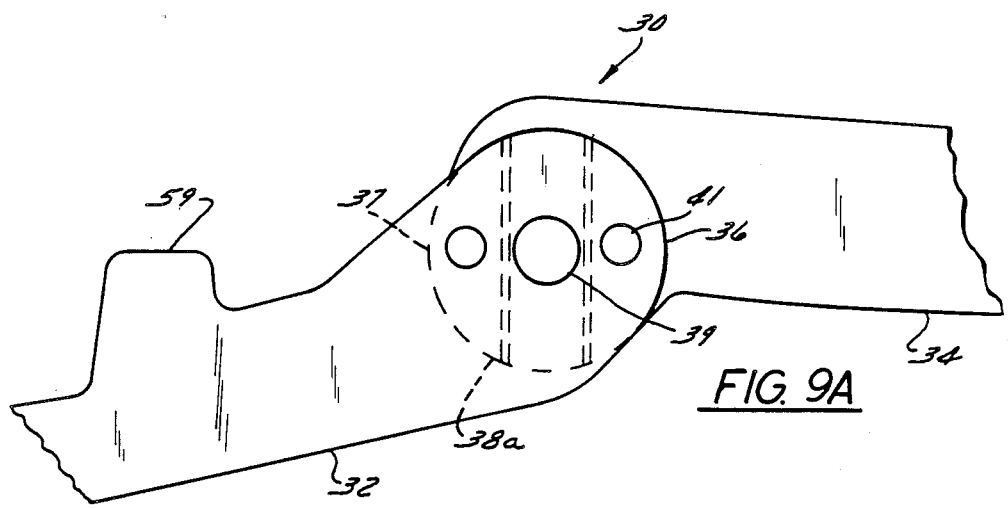
FIG. 9 is a side view, partially in section, of another embodiment of the present invention.
Figure 9:
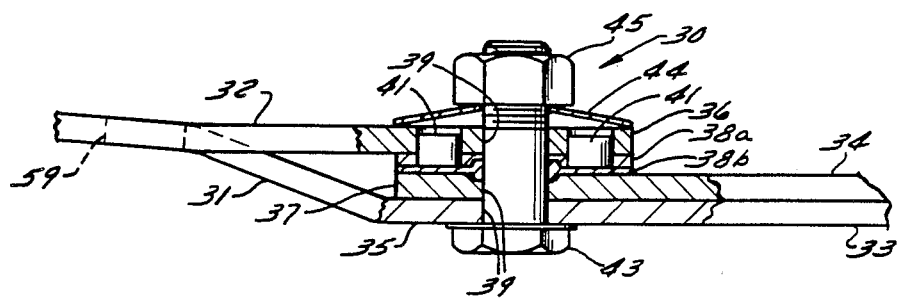
Figure 10:
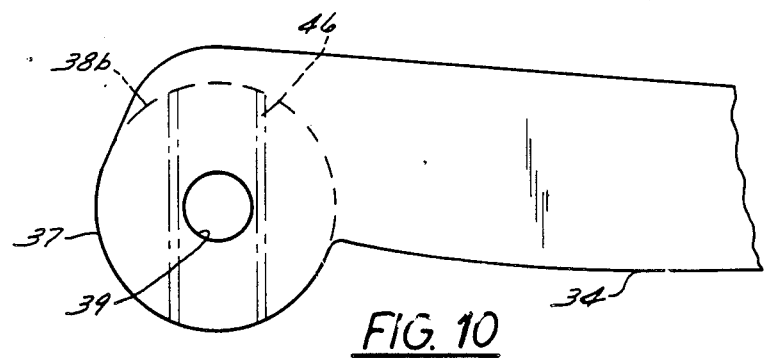
FIGS. 10 and 10A are, respectively, a top plan view of the clutch portions of the blade member set forth in FIG. 9 and a side view of the same member.
Figure 10A:
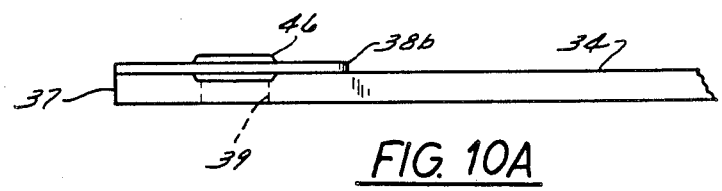
Figure 11:
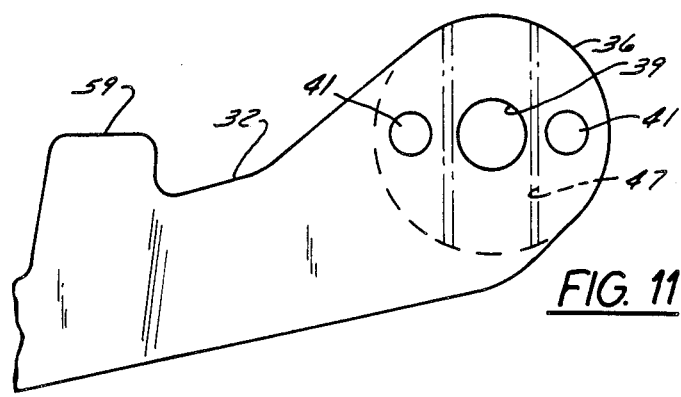
FIGS. 11 and 11A are, respectively, a top plan view of the clutch portion of the handle member shown in FIG. 9 and a side view of the same member.
Figure 11A:
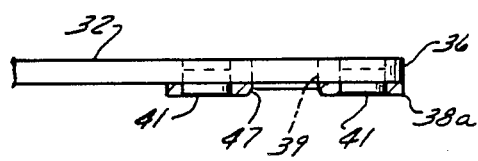

Another embodiment of the present invention best illustrated by FIGS. 9-11 depicting shear assembly shown generally as 30, comprised of a pair of handle levers 31, 32, and a pair of shearing members 33, 34. The clutch mechanism itself comprises a plurality of plates 35, 36, 38a and 38b. Plate 35 is an intermediate portion of and integral with handle lever 31 and shearing member 33. Plate 36 is the terminal portion of lever 32 while plate 37 is the terminal portion of shearing member 34. Interposed between and abutting the respective interior faces of plates 36 and 37 are clutch plates 38a and 38b. Plate 38a and 38b are shown as fixed to plate 36 by a plurality of plugs of material 41 made by semi-piercing holes in plates 36 and 37 during the manufacturing process. The clutch plate disks 38a and 38b are placed between plates 36 and 37 whereupon the plugs 41 form corresponding grooves in the facing surfaces of plates 38a and 38b, providing an essentially non-rotatable interface therebetween. Each of the plates are provided with bore 39, which i coaxially aligned to receive a bolt 43. Located about bolt 43 is a biasing mechanism, shown here as a conical spring washer 44, which is compressed against the top face of plate 36 by nut 45 threadly engaged to bolt 43.

As perhaps best seen in FIG. 9, in conjunction with FIGS. 10, 10A and 11, 11A, one of the faces of plate 38a or 38b may be provided with one or more radially directed tongues 46 shown in phantom in FIG. 10 adapted to mate with grooves 47 in the other of faces 38a or 38b. Grooves 47 are generally directed radially out from the axial center of the aligned bores and are machined to receive and carefully match the configuration of a respective tongue 46. Tongues 46 and grooves 47 have side walls at a slight angle of deviation from the vertical to facilitate the desired camming action responsive to generation of forces beyond a predetermined limit. While the actual angle (as with the embodiment of FIGS. 2-6) is a matter of choice, depending upon the desired maximum cutting force, it has been determined that a deviation angle of about five degrees (5°) provides for a suitable maximum cutting force in typical applications.

Because plates 38a and 38b can be made separately from the hardened steel material of the shearing blades, the camming configuration, e.g., tongues and grooves, can more easily be fabricated. Typically, such clutch plates are formed using powdered metal technology facilitating the fabrication of the camming surfaces.

Although the embodiment illustrated by FIGS. 9-11 depict the use of two clutch plates as replaceable wearing surfaces, it is contemplated that a single replaceable clutch plate could be suitable in some applications. For example, clutch plate 38a could be fixed against relative rotary motion to plate 36 by plugs of material 41 and be provided with one or more radially directed tongues 46 meshing with a complementary groove on the interior surface of plate 37. Thus, the need for plate 38b would be obviated.

While the preferred embodiment describes the use of one or more tongues meshing with respective grooves, it is contemplated that in some applications the use of, for example, a pair of two diametrically opposed pins could be provided on each of the interior faces of plates 36 and 37 with complimentary grooves 47. The number of grooves and pins could also be varied. For example, a single, radially directed groove could be employed with a plurality of pins 46 aligned radially along the interior faces. Alternatively, a plurality of separate indentations matching the selected numbers of pins 46 may also be utilized in lieu of grooves.

If desired, tongues 46 can be located on the opposite faces of plate 38 and grooves or indentations 47 on the interior faces of plates 36 and 37. Alternatively, a combination of tongues and grooves can be provided on each of the engaging faces of all three plates, giving due regard to the need to avoid abutment of tongues located on adjacent faces.

The embodiment as set forth in FIGS. 9-11 operates in essentially the same manner as the embodiment of FIGS. 2-6. Under normal conditions, the leveraging of handles 31 and 32 causes shearing members 33 and 34 to converge, cutting materials encountered between the blades thereof. Normally, the vertical component of cutting force at the wall of the grooves 47 under such conditions is less then the downward force of spring washer 44, and plates 38a and 38b remained intermeshed coupled by groove-tongue interaction. If, however the vertical component of the cutting force reaches a predetermined maximum value, the respective torques of one of the plates 38a and 38b cam out of respective grooves 47 in the other plate 38a and 38b. Thus, plates 36 and 37 rotate about bolt 43 independently and shearing members 33 and 34 cease their shearing movement.

While various embodiments of the invention have been shown and described, it will be understood that the invention may take on other embodiments without departing from the scope and spirit of the appended claims.

I claim:
1. A shearing device comprising:
   (a) a pivot mechanism;
   (b) first and second handle levers rotatably mounted on said pivot mechanism and capable of being articulated between an open and closed position;
   (c) first and second shearing members rotatably mounted on said pivot mechanism, said first members being integrally connected to said first lever;
   (d) clutch assembly means positioned intermediate said pairs of levers and members for operatively connecting said second lever to said second member, said assembly means including
      (i) first and second clutch plates each having respective facing surfaces with complimentary configurations; and
   (e) biasing means positioned adjacent said plates for biasly forcing said surfaces into an abutting relationship, said surfaces having an intermeshing relationship when said plates are in a predetermined rotary alignment, said clutch assembly means responsive to a predetermined force of a level sufficient to overcome the force exerted by said biasing means generated when said handle levers are articulated toward said closed position and said shearing members encounter cut resistant material for camming said plate surfaces out of said meshing relationship and operatively disconnecting said second lever from said second member.

2. The shearing device of claim 1 in which one of said shearing members returns said clutch surfaces to said intermeshing relationship when said handle levers are articulated to said open position thereby operatively connecting said second lever to said second member.

3. The shearing device of claim 1 in which said surface of one of said clutch plates has at least one recess and said surface of the other of said clutch plate surfaces has at least one axially extended extension matable with said recess.

4. The shearing device of claim 3 in which the walls of said extension are at angle to a line vertical with respect to the face of the said one of said clutch plates.

5. The shearing device of claim 1 in which said biasing means is a conical spring washer.

6. The shearing device of claim 5 in which said conical spring washer is a Belleville spring.

7. The shearing device of claim 1 in which said second lever is integral with said first clutch plate.

8. The shearing device of claim 1 in which said second member is integral with said second clutch plate.

9. A shearing device for cutting shrubbery comprising:
   a pivot mechanism;
   first and second handle levers rotatably mounted on said pivot mechanism and capable of being articulated open and closed;
   first and second shearing member pivotably mounted on said pivot mechanism, said second handle and second member being integral;
   a clutch plate pivotably mounted on said pivot mechanism between said first handle and member, said first handle and first member having integral clutch faces adjacent said clutch plate which faces have fixed configurations meshing with complimentary configurations on said clutch plate; and adjustable biasing means for releasably maintaining said clutch faces in an abutting and intermeshing relationship with said clutch plate when in a predetermined rotary alignment and releasing said faces from the intermeshing relationship in response to a predetermined force generated when said shearing members counter cut resistant material.

10. The shearing device of claim 9 in which said second shearing member returns said first shearing member to said intermeshing relationship with said clutch plate when said handle levers are articulated open after said faces are released from said intermeshing relationship.

11. The shearing device of claim 9 in which said adjustably biasing means is a conical spring washer.

12. The shearing device claim 11 in which said conical spring washer is a Belleville spring.

13. A shearing device comprising:
   (a) pivot mechanism;
   (b) first and second handle levers rotatably mounted on said pivot mechanism and capable of being articulated between an open and closed position;
   (c) first and second shearing means rotatably mounted on said pivot mechanism, said first and second means being operatively connected to said first and second levers, respectively;
   (d) a clutch assembly means positioned intermediate said pair of levers and members for operatively connecting the other of said levers to the other of said members, said clutch means including a first clutch plate being integral with said other of said lever, a second clutch plate being integral with said other member, and a third clutch plate positioned between said first and second clutch plates wherein said third clutch plate has a pair of faces each provided with a configuration which mesh with complimentary configurations on respective facing faces of said first and second clutch plates when said plates are in a predetermined alignment; and
   (e) means for urging said plates into an abutting relationship, said clutch means responsive to a force of predetermined magnitude generated when said shearing means are articulated against cut resistant material for moving said plates out of said predetermined alignment and operatively disconnecting said other lever from said other member.

14. The device of claim 13 in which said biasing means is a conical spring washer.

15. The device of claim 14 in which said washer is a Belleville spring.

16. The device of claim 13 in which at least one of said plates has at least one recess and the adjacent other plate has at least one axially projection mating with said recess.

17. The device of claim 13 in which said recess is a radial positioned groove and said projection is a mating tongue.

18. A shearing device capable of being articulated between open and closed positions for cutting material comprising:
   (a) a first pivotally mounted handle lever directly connected to a first shearing member;

(b) a second pivotally mounted handle;
(c) a second pivotally mounted shearing member;
(d) clutch means for operatively connecting said second handle and second lever, said clutch means positioned between said second handle and second shearing member for operatively disconnecting said second lever from said second member in response to a predetermined level of force applied to said handles when said shearing members encounter cut resistant material,
  (i) said clutch means comprising first and second clutch plates having opposing surfaces disposed generally parallel to the plane of articulation of said levers and members, one of said plates being coupled to said first lever handle and the other plate coupled to said first member,
  (ii) a projection positioned on one side of said surface extending in a direction generally perpendicular to said plane,
  (iii) a recess positioned on the other of said surfaces adapted to selectively receive said projection,
  (iv) said recesses having sidewalls extending a predetermined angle from the perpendicular to said plane, and being disposed such that when said projection is received in said recess that levering said handle levers generates an outwardly directed component of force as between said projection and said recess, tending to dislodge said projection from said recess,
  (v) biasing means for exerting an inwardly directed force on said projection and recess tending to maintain said projection in engagement with said recesses, and
  (vi) said projection being normally received in said recess, but dislodging and in response to levering of said handle members generating an outwardly directed component of force of greater magnitude than said inwardly directed force.

19. The shearing device of claim 18 wherein said projection includes sidewalls disposed to cooperate with said recess sidewalls, extending along a second predetermined angle from the perpendicular to said predetermined plane.

20. The shearing device of claim 19 wherein said second predetermined angle is approximately equal to said first mentioned predetermined angle.

21. The shearing device of claim 18 wherein said predetermined angle is approximately 5°.

22. The shearing device of claim 21 wherein said predetermined angles are approximately 5°.

* * * * *